Figure 1:
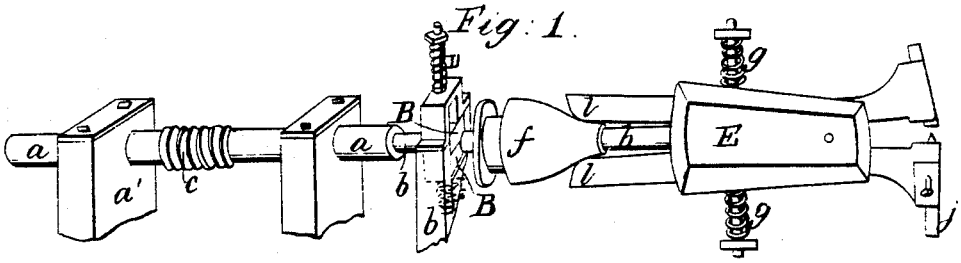
Figure 3:
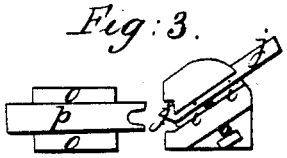
Figure 2:
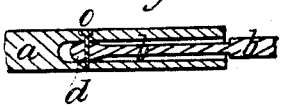
Figure 4:
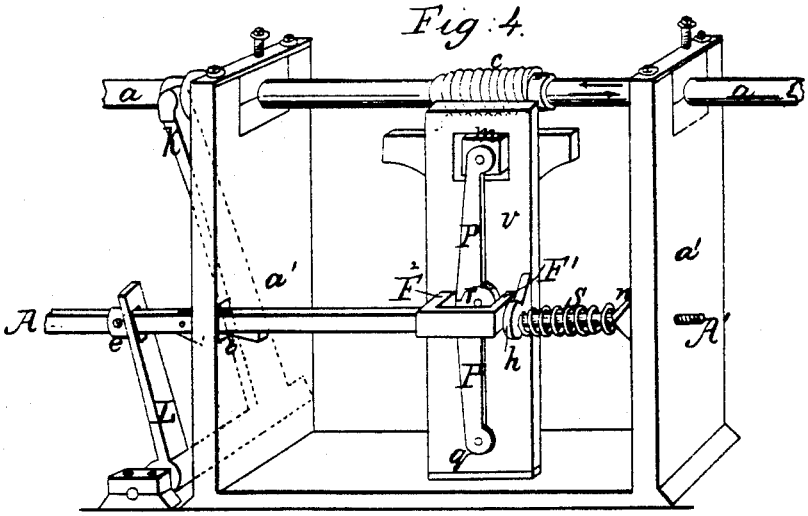

BEST AVAILABLE COPY

H. Crum,

Making Wood Screws,

No. 28. R. I. Patented Nov. 21, 1839.

R. PETTEE PHOTO-LITHOGRAPHER, WASHINGTON, D. C.